UNITED STATES PATENT OFFICE.

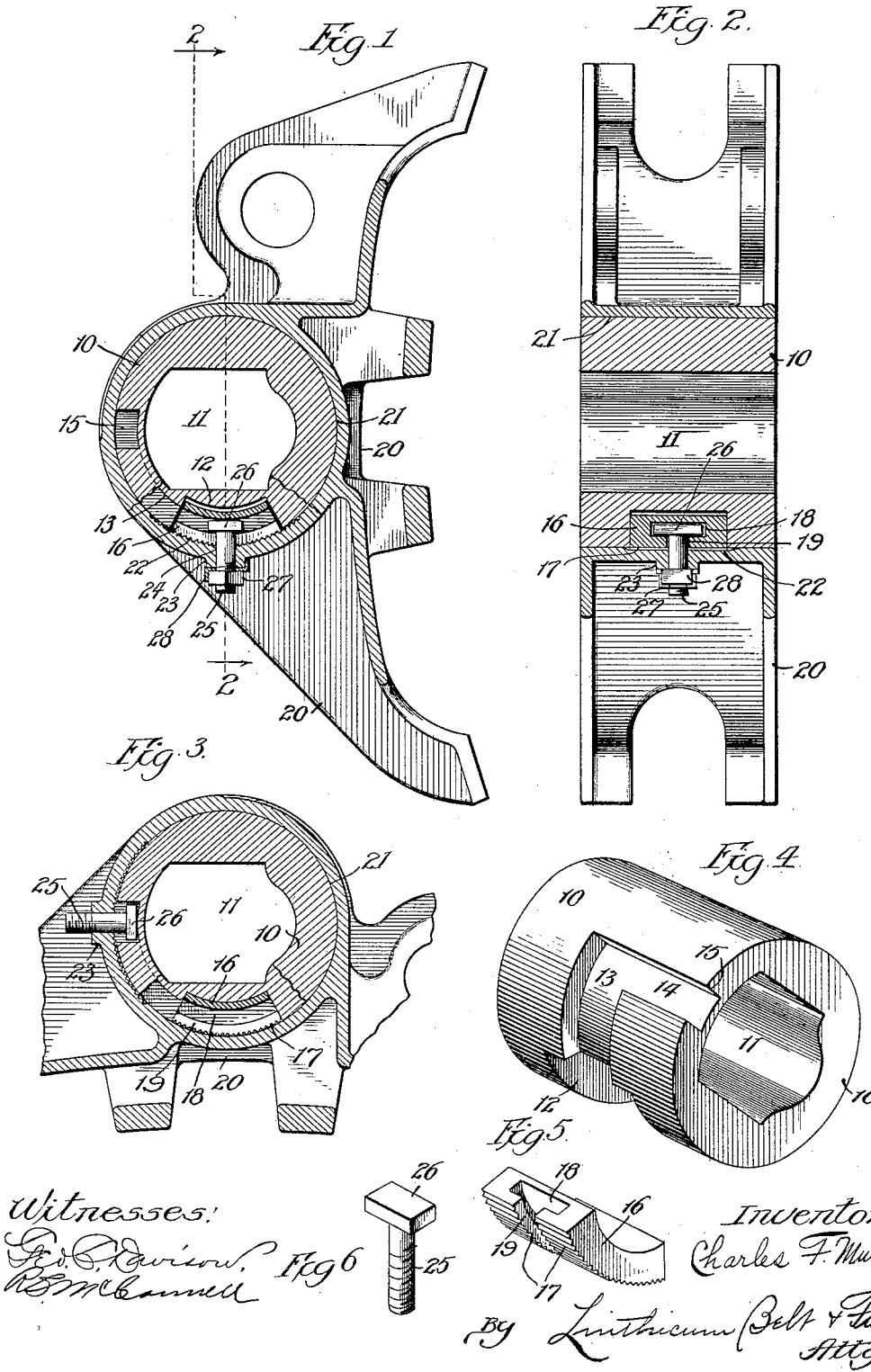

CHARLES F. MURRAY, OF CHICAGO, ILLINOIS, ASSIGNOR TO SIMPLEX RAILWAY APPLIANCE COMPANY, OF CHICAGO, ILLINOIS, A CORPORATION OF ILLINOIS.

ADJUSTABLE BRAKE-HEAD.

1,056,358. Specification of Letters Patent. Patented Mar. 18, 1913.

Application filed August 5, 1909. Serial No. 511,281.

*To all whom it may concern:*

Be it known that I, CHARLES F. MURRAY, a citizen of the United States, residing at Chicago, in the county of Cook and State of Illinois, have invented certain new and useful Improvements in Adjustable Brake-Heads, of which the following is a specification.

Various devices have heretofore been devised for locking in adjusted position the brake heads and shoes of car brake-beams, and it is to the improvement of this class of devices that this invention is aimed, its principal object and purpose being to provide a construction of this general character which will be simple, which will be economical to manufacture, which will have substantially all of its parts inclosed within the brake-head proper, and which will effectively and efficiently lock or hold the brake-head in adjusted position.

To carry out my invention therefore in the preferred embodiment thereof, I provide in the sleeve fitted on the end of the brake-beam a recess which accommodates a curved lock-block having an undercut groove. On the exterior, cylindrical surface of this sleeve and communicating with the recess is a right-angle, open-ended groove or slot which permits the introduction of the head of a tightening bolt into the groove of the block, the bolt extending outwardly through an aperture or hole through the brake-head and having externally of the latter a tightening nut adapted to draw the locking block outwardly into effective engagement with the inner surface of the brake-head, whereby to lock and clamp such head in the proper adjusted position. In this particular exemplification of the invention, the locking block is not movable in its recess in the sleeve except outwardly, but the bolt and its head slide readily in the groove of the block, thereby permitting the desired rotary adjustment of the head and shoe, and after such proper position of the parts is secured, the lock may be actuated by the bolt to lock and secure the head in place.

In the accompanying drawing, I have shown one desirable embodiment of the invention, and in this drawing, Figure 1 is a section through a brake-head and brake-beam sleeve, the parts being equipped with one form of my improved locking means, and certain parts being broken away to more clearly show the exact construction; Fig. 2 is a section on line 2—2 of Fig. 1; Fig. 3 is a fragmentary section, with parts broken away, similar to Fig. 1, showing the manner of application of the brake head and bolt to the sleeve; Fig. 4 is a perspective view of the brake-beam sleeve; Fig. 5 is a similar view of the roughened or serrated locking block; and Fig. 6 is a perspective view of the bolt employed for actuating such block.

I have deemed it unnecessary to show an entire brake-beam or the tension and compression members thereof, feeling that it is sufficient to merely illustrate the sleeve 10, which is adapted to be fitted, as will be readily understood by those skilled in the art, over the ends of the tension and compression members of the brake-beam, the center of such sleeve being provided with the usual aperture 11 for the accommodation and reception of such parts. The outer surface of this sleeve is of the usual cylindrical form, and is supplied, desirably midway its length, with a rectangular, curved recess 12, opening centrally into one end of which is a right-angle groove 13, one leg 14 of which is disposed longitudinally of the sleeve and extends to the end thereof, so that the groove at that end 15 is open, as is clearly shown in Fig. 4, and for a purpose hereinafter indicated.

The recess 12 is adapted and intended to accommodate a curved locking block 16 of substantially the same size as the recess, the outer surface of such block being transversely serrated or roughened, as is indicated at 17, the lock-block also having a curved, longitudinal, undercut groove 18 extended inwardly from its outer roughened face, the contracted portion of such groove being characterized 19 in the drawing.

The brake-head 20 has a cylindrical aperture 21 of practically the same diameter and adapted to fit over the brake-beam sleeve 10, as is usual and customary in constructions of this character. A portion of the inner cylindrical surface of this brake-head is serrated or roughened, as at 22, such surface being adapted to coact and coöperate with the corresponding outer surface 17 of the lock-block. At substantially the middle of this roughened brake-head inner surface, the head is thickened to provide a boss 23, the head having extended through itself and the boss a hole or aperture 24 for the accommodation of a bolt 25, the flat head 26 of which is of substantially the same size and adapted to fit in the undercut groove 18. Outside of the brake-head, this tightening or block-operating bolt is equipped with a nut 27, and any suitable form of nut-lock 28. In the present instance, such nut-lock takes the form of a flat plate bent outwardly to engage one side of the nut and bent inwardly to bear against one side of the boss. The form or style of nut-lock, as will be readily appreciated by those skilled in the art, is of course quite immaterial.

Assuming that it is desired to assemble the parts of this device and to fix or lock the brake-head in adjusted position, the lock-block 16 is placed in its recess 12 of the sleeve, the bolt 25 is inserted in the aperture or hole 24 with the head of the bolt inside of the brake-head; the latter is then brought to the position indicated in Fig. 3, so that the bolt head 26 is in register with the open mouth 15 of the right-angle groove 13. The brake-head is then pushed or slid onto the sleeve as far as it will go, which is determined and limited by the engagement of the bolt head with the end of the portion 14 of the right-angle slot 13. The head may then be turned or rotated on the sleeve, the bolt-head traveling in the right-angle slot 13 and passing therefrom into the undercut groove 18 of the lock-block 16, the contracted or restricted portion 19 of which is in width substantially equal to the diameter of the shank of the bolt. The brake-head is now brought to the desired or required adjusted position so that its shoe will properly fit the car-wheel, this adjustment of the head being permitted by the free and easy travel of the bolt and its head in the groove of the lock-block. The parts having been brought to this position, the nut-lock 28 is placed over the bolt and the nut 27 screwed up so as to draw the lock-block 16 outwardly into effective engagement with the roughened inner surface 22 of the brake-head, thereby securely locking and fixing the head in proper adjusted position, backing off of the nut due to the vibration of the brake-beam being prevented by the nut-lock, the portions of which are bent up and down, as indicated above, after the nut has been screwed up to the proper place. To take off the brake-head, it is merely necessary to bend back the locking portions of the nut-lock and unscrew the nut 27, after which the brake-head and its bolt are free to turn, and after having been rotated so as to bring the head of the bolt into register with the portion 14 of the slot 13, the head and bolt may be slipped off of the sleeve, the bolt-head, as is obvious, passing out of the mouth or open end 15 of the groove.

This invention being susceptible of a considerable number of embodiments, it is therefore to be understood that the appended claims are not to be limited or restricted to a construction having the particular and exact structural features of that herein described and set forth. Many changes may be made in a device of this character without departure from the substance of the invention and without the sacrifice of any especial benefits or advantages.

I claim:

1. In a device of the character described, the combination of a brake-beam, a brake-head adapted to fit on and rotatably adjustable on said brake-beam, a lock-block in a recess of said brake-beam adapted to bear against an inner surface of said head to maintain the latter in adjusted position, and actuating means for said block to force the latter into locking contact with said head, said actuating means extending through an aperture of said head and operable from the exterior of said head, substantially as described.

2. In a device of the character described, the combination of a brake-beam having a recess in its outer surface, a brake-head adapted to fit on and rotatably adjustable on said brake-beam, a lock-block in said recess and adapted to bear against an inner surface of said head to maintain the latter in adjusted position, said lock-block having an undercut groove, a bolt extended through a hole in said brake-head and having its head in the undercut groove of said lock-block, and a nut on said bolt adapted to actuate the latter, whereby to force said block into locking contact with said head, substantially as described.

3. In a device of the character described, the combination of a brake-beam, a recessed sleeve fitted on the end of said beam, a lock-block in said recess, a brake-head adapted to fit on and rotatably adjustable on said sleeve, and actuating means for said lock-block extending through said brake-head and operable from the outside thereof, whereby to force said block into locking engagement with the interior of said head to hold said head in adjusted position, substantially as described.

4. In a device of the character described, the combination of a brake-beam, a recessed sleeve fitted on the end of said brake-beam, said sleeve having an open-ended groove communicating with said recess, a lock-block in said recess, a brake-head adapted to fit on and rotatably adjustable on said sleeve, a bolt extended through said brake-head and coöperating with said lock-block, and a nut on said bolt outside of said brake-head and adapted to actuate said bolt to force said lock-block outwardly into locking engagement with the interior of said brake-head, said sleeve-groove permitting the passage of said bolt-head therethrough into coöperative engagement with said lock-block, substantially as described.

5. In a device of the character described, the combination of a brake-beam, a recessed sleeve fitted on the end of said beam, a lock-block in said recess, a brake-head adapted to fit on and rotatably adjustable on said sleeve, and means to actuate said lock-block extended through said brake-head and operable from the outside of the latter, said block-actuating means having adjustable engagement with said block, whereby said block may be forced outwardly into locking engagement with the interior of said head to hold the latter in adjusted position, substantially as described.

6. In a device of the character described, the combination of a brake-beam, a recessed cylindrical sleeve fitted on an end of said brake-beam and provided with an open-ended groove communicating with said recess, a lock-block fitted in said recess, said block having an undercut groove, a brake-head adapted to fit on and rotatably adjustable on said sleeve and having an aperture extended therethrough, a bolt in said aperture, the head of said bolt being fitted and adjustable in the undercut groove of said lock-block, and a nut on said bolt outside of said brake-head and adapted to actuate said bolt to draw said lock-block outwardly into locking engagement with the interior of said brake-head to hold the latter in adjusted position, said open-ended groove permitting the passage of the bolt-head therethrough, whereby to secure its entrance into the undercut groove of said block while the latter is in the sleeve recess, substantially as described.

7. The combination of a brake beam and a brake head, said beam carrying a locking block that is movable with relation to said beam and is arranged to be pressed against the inner surface of said head to prevent rotation of the latter, said block having means for preventing withdrawal of said head from said beam.

CHARLES F. MURRAY.

Witnesses:
M. A. KIDDIE,
WALTER M. FULLER.

Copies of this patent may be obtained for five cents each, by addressing the "Commissioner of Patents, Washington, D. C."